United States Patent
Kobylinski

(10) Patent No.: US 6,179,269 B1
(45) Date of Patent: Jan. 30, 2001

(54) METHOD AND APPARATUS FOR INSTALLING A CABLE INTO COILED TUBING

(75) Inventor: Lee S. Kobylinski, Bartlesville, OK (US)

(73) Assignee: Camco International, Inc., Houston, TX (US)

(*) Notice: Under 35 U.S.C. 154(b), the term of this patent shall be extended for 0 days.

(21) Appl. No.: 09/137,428

(22) Filed: Aug. 21, 1998

(51) Int. Cl.⁷ ......................................................... H02G 1/08
(52) U.S. Cl. ...................................... 254/134.3; 254/134.4
(58) Field of Search ................................... 254/134.3 FT, 254/134.4, 134.3 R; 226/25, 43, 178, 97; 15/104.06; 166/77

(56) References Cited

U.S. PATENT DOCUMENTS

| | | |
|---|---|---|
| 2,567,009 | 9/1951 | Calhoun et al. . |
| 2,981,454 | 4/1961 | Dickinson et al. . |
| 4,148,463 | 4/1979 | Schrum . |
| 4,508,251 | 4/1985 | Harada et al. . |
| 5,143,353 | 9/1992 | Sano et al. . |
| 5,152,506 | 10/1992 | Pickrell . |
| 5,308,041 * | 5/1994 | Griffioen et al. ................. 254/134.4 |
| 5,324,006 | 6/1994 | Pickrell . |
| 5,348,097 | 9/1994 | Giannesini et al. . |
| 5,503,370 | 4/1996 | Newman et al. . |
| 5,599,004 | 2/1997 | Newman et al. . |
| 5,813,658 * | 9/1998 | Kaminski et al. ................. 254/134.3 |
| 5,950,298 * | 9/1999 | Griffioen et al. ........................ 29/433 |
| 5,967,495 * | 10/1999 | Kaminski et al. ................. 254/134.4 |
| 6,012,621 * | 1/2000 | Holum et al. ............................ 226/35 |
| 6,019,351 * | 2/2000 | Allen ................................. 254/134.4 |

FOREIGN PATENT DOCUMENTS

| | | |
|---|---|---|
| 2 171 218 | 8/1986 | (GB) . |
| WO98/26320 | 6/1998 | (WO) . |

* cited by examiner

Primary Examiner—David A. Scherbel
Assistant Examiner—Daniel Shanley
(74) Attorney, Agent, or Firm—Fletcher, Yoder & Van Someren

(57) ABSTRACT

A technique for installing a length of cable assembly and coiled tubing includes application of both compressive and tensile forces on the cable assembly. The compressive forces are applied to the cable assembly in a compression station at an entry end of the coiled tubing. Tensile forces are applied to the cable assembly by a wire line or a similar structure situated at an exit end of the coiled tubing. Following installation of the cable assembly in the coiled tubing, the coiled tubing may be transported to an application site, and coupled to equipment, such as a submersible pumping system. The submersible pumping system may then be deployed by extension of the coiled tubing and cable assembly. Additional lengths may be obtained by joining subassemblies formed by the tensile and compressive force technique. The technique reduces residual elongation or strain in the cable assembly as compared to conventional methods.

16 Claims, 7 Drawing Sheets

METHOD AND APPARATUS FOR INSTALLING A CABLE INTO COILED TUBING

BACKGROUND OF THE INVENTION

1. Field of the Invention

The present invention relates generally to devices and techniques for installing cable, such as power cable, into coiled tubing such as for use in delivering electrical power to submerged machinery in a petroleum well. More particularly, the invention relates to a novel technique for installing lengths of cable in coiled tubing by at least partially placing the cable or cable shielding under compressive loading at an entry end of the coiled tubing.

2. Description of the Related Art

A number of applications exist wherein power or data signals must be supplied to remote subsea or subterranean locations, such as to drive or control underground equipment. For example, in the field of petroleum extraction and exploitation, it is commonplace to form a wellbore that penetrates a number of subterranean zones, including one or more zones of interest. The zones of interest commonly include geological horizons bearing minerals, such as petroleum, gas, paraffin, and so forth. The minerals flow into the wellbore and are removed by pumping systems either situated at the earth's surface or submerged within the wellbore. In either case, it is often necessary to transmit electrical power or control signals to equipment situated in the wellbore to power or control operation of the downhole equipment.

In one class of equipment used in petroleum and similar wells, a submersible electric motor is coupled to one or more pumps. The electric motor is powered by cables extending from a power supply at the earth's surface. As the electric motor is driven, the pumps displace wellbore fluids, transmitting fluids of interest to a location above the earth's surface for collection and further processing. Certain systems of this type also include ancillary equipment such as fluid separators, injection pumps, and so forth, adding to the complexity and flexibility of the overall system.

In heretofore known devices, several techniques have been employed for transmitting power and control signals to downhole equipment in wells. For example, various types of shielded cable are known and are currently available for transmitting significant levels of electrical power to submerged pumping systems of the type described above. The cables may include multiple conductors, such as for three-phase operation, and are commonly shielded by a flexible, durable metallic casing or armor designed to reduce the risk of damage to the power conductors during deployment and use of the equipment. Control signals may be superimposed on power signals in certain applications, or may be transmitted via separate cables, radio telemetry, or other signal transmission techniques.

In an increasing number of applications, it is useful to dispose cables and signal conductors in extended lengths of conduit extending between the earth's surface and a submerged pumping system, particularly in petroleum and other production wells. One particular type of conduit presently employed in such systems is coiled tubing, which is available in extended lengths capable of being wound around a storage spool. The tubing may be deployed in the well by unwinding it from the storage spool. Lengths of tubing may be spliced together, as required by the depth at which the submerged equipment is deployed. A difficulty arises, however, in insertion of the cable conductors in the tubing or conduit. In many applications it is preferable to pre-install the cable in lengths of conduit to facilitate proper attachment of the cable to the submerged equipment prior to deployment. Presently, power cable is installed in coiled tubing by tensioning the cable during the installation process and drawing the cable through extended lengths of tubing, often several thousand feet long.

Significant disadvantages have been encountered in tensioning techniques for deploying cables in conduit such as coiled tubing. For example, high tension tensile forces are required to draw the cable into the tubing, owing to the weight of the cable and to frictional forces between the interior of the conduit and the exterior of the cable shielding. Such forces can result in damage to the cable during installation process. Moreover, excessive tension in the cable can lead to stretching of the cable during installation. Residual strain resulting from such tension may then be stored along the cable, which remains unrelaxed prior to connection to the powered equipment. During subsequent operation, the residual strain can be relieved, leading to contraction of the cable and, in certain cases, interruption of electrical power between the submerged equipment and wellhead equipment.

There is a need, therefore, for an improved technique for installing conductive cabling, such as power cable into a conduit. In particular, there is a need for a technique for positioning power cable in coiled tubing and the like over considerable lengths that addresses or avoids the drawbacks of prior art techniques, such as damage to the cable or conduit, and storage of residual strain within the cable.

SUMMARY OF THE INVENTION

The present invention provides a novel technique for installing power cables and similar conductors in conduits designed to respond to these needs. The technique applies a compressive loading to a portion of the cable to urge the cable into an entry end of the conduit. The compressive forces are sufficient for installing the cable into the conduit over relatively shorter lengths. For longer lengths of cable and conduit, the compressive insertion approach can be used in combination with cable tensioning. The combined use of compression and tension permits extended lengths of cable to be installed in conduit without damage to the cable or conduit. The inventive technique also significantly limits or reduces the tendency of the cable to store residual stain.

In accordance with a first aspect of the invention, an apparatus is provided for installing a cable in an elongated conduit. The conduit has a substantially closed side wall extending between first and second open ends. The apparatus includes a compression station and a tension station. The compression station is disposed adjacent to the first end of the conduit and contacts the cable to exert compressive forces on the cable to urge the cable into the conduit via the first end. The tension station is disposed adjacent to the second end and contacts the cable to exert tensile forces on the cable to draw the cable toward the second end. The compression station advantageously includes a drive unit in which mutually opposed drive members receive the cable therebetween and urge the cable toward the first end of the conduit. The drive members preferably include an endless belt which contacts the cable over a predetermined length thereof.

In accordance with another aspect of the invention, a method is provided for installing a cable, such as a power cable into an elongated conduit, such as coiled tubing for use with a submersible pumping system. The method includes the steps of exerting longitudinal compressive forces on the cable to urge the cable into the conduit via a first end thereof, and exerting tensile forces on the cable to draw the cable through the conduit towards a second end thereof. The step of exerting the compressive forces on the cable is advantageously accomplished by drawing the cable through a compression station, the compression station contacting the cable to exert radial compressive forces on the cable to drive the cable into the conduit. The compression station preferably exerts the radial compressive forces against an external shielding layer provided on the cable. In a preferred arrangement, frictional forces between the cable and internal surfaces of the conduit are opposed primarily by the longitudinal compressive forces during a first phase of installation, and primarily by the tensile forces during a second phase of installation.

In accordance with a further aspect of the invention, a method is provided for installing a submersible pumping system in a well. The method includes the steps of installing a power cable in a length of coil tubing by exerting compressive and tensile forces on the cable. The cable and tubing are then coupled to the submersible pumping system. The cable and tubing are extended into the well to position the submersible pumping system at desired location in the well. In a preferred embodiment, the compressive forces are exerted on the cable by a compression station disposed adjacent to a first end of the tubing, while the tensile forces are exerted by a tension station disposed adjacent to a second end of the tubing. The method may include the further steps of unwinding the tubing from a storage reel prior to installation of the cable, and rewinding the tubing, including the installed cable, once the cable has been fully deployed in the tubing.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
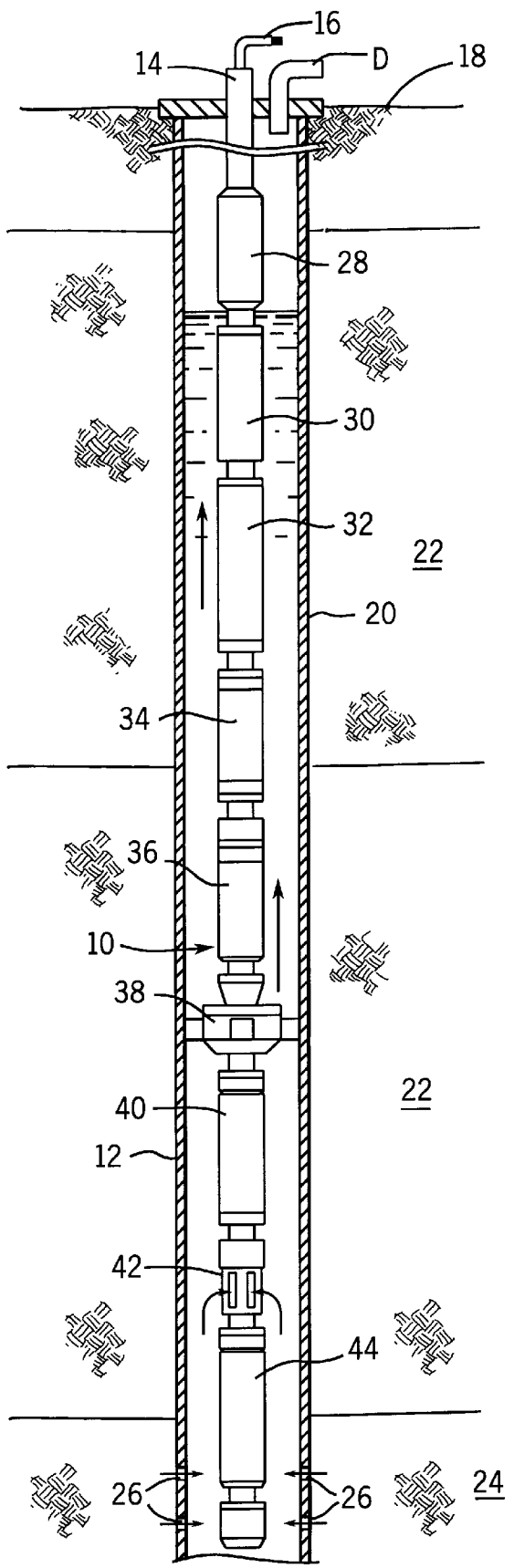
FIG. 1 is a vertical elevational view of a pumping system deployed in a well and coupled to receive power through a cable assembly positioned in a length of coiled tubing in accordance with certain aspects of the present technique.

Turning now to the drawings and referring first to FIG. 1, a coiled tubingdeployed pumping system is illustrated diagrammatically and designated generally by the reference numeral 10. Pumping system 10 is deployed in a production well 12 for raising production fluids, such as oil, gas, paraffin, or other minerals of interest to the earth's surface. Pumping system 10 is suspended in well 12 by means of a length of coiled tubing 14. A cable assembly 16 is positioned in coiled tubing 14 for transmitting electrical power to the pumping system as well as for transmitting control and data signals between the pumping system and above-ground equipment. Coiled tubing 14 and cable assembly 16 terminate at a location above the earth's surface 18, where interfacing retention hardware and circuitry (not shown) will generally be located. As will be apparent to those skilled in the art, the coiled tubing-deployed pumping system illustrated in FIG. 1 may also be positioned at a location beneath a body of water, such as below the sea floor.

Extending from the earth's surface, well 12 is surrounded by a wellbore casing 20 which traverses a number of subterranean geological formations 22, of which a production horizon 24 contains minerals of interest to be raised by the pumping system. Such production fluids enter into well 12 through perforations 26 formed in casing 20 adjacent to production horizon 24 during completion of the well.

In the illustrated embodiment, coiled tubing 14 and cable assembly 16 installed therein by a technique described below, serve to suspend the pumping system in the well, and to supply power and data signals for operation of the pumping system. Coiled tubing 14 is secured to a coiled tubing connector 28 during assembly of the pumping system prior to its deployment. Coiled tubing connector 28 serves both to mechanically couple the pumping system to the stand of coiled tubing, as well as to permit power and data signals to be transmitted from cable assembly 16 to the other components of the pumping system positioned therebelow.

In the illustrated embodiment, coiled tubing connector 28 suspends modular components making up the pumping system, including a sealing chamber 30, a submersible electric motor 32, a motor base assembly 34, a motor protector 36, a seating shoe and lock down discharge head 38, a pump 40, an intake section 42, and a thrust section 44. Sealing chamber 30 isolates motor 32 from wellbore fluids surrounding the pumping system, and serves to seal both coiled tubing connector 28 and motor 32 when deployed. As will be appreciated by those skilled in the art, in appropriate systems, coiled tubing connector 28 and sealing chamber 30 may be combined in a single component designed to interface between a length of coiled tubing and a motor and to support the pumping system from the coiled tubing, while accommodating passage of cables of a cable assembly installed in the coiled tubing as described below. Motor 32, which receives electrical power via cable assembly 16, may be any suitable type of motor, such as a polyphase induction motor the interior of which is flooded with a high grade mineral oil. Motor protector 36 is coupled to motor 32 and serves to prevent wellbore fluids from entering into the motor during operation. Accordingly, any suitable type of motor protector may be employed for this purpose, such as protectors including piston, bladder, labyrinth, and other isolation devices.

Motor 32 drives pump 40 through the intermediary of motor base assembly 34, motor protector 36, and seating shoe and lock down discharge head 38. Accordingly, as will be apparent to those skilled in the art, interconnected shaft and bearing assemblies (not shown) extend from motor 32 through the motor base assembly 34, motor protector 36 and seating shoe and discharge head 38 to drive a pump shaft within pump 40 (not shown). Pump 40 may be any suitable type of pump, such as a multi-stage centrifugal pump designed to draw wellbore fluids through intake section 42 and discharge the fluids at a level above seating shoe and discharge head 38. Seating shoe and discharge head 38, in turn, extends to well casing 20 to divide the well into upper and lower zones, corresponding to an intake side and a discharge side of the pumping system. Fluids displaced by pump 40 thus rise in an annular area surrounding the upper components of the pumping system, to be discharged from the well via a discharge conduit, as represented generally by conduit D in FIG. 1. Finally, thrust section 44 serves to absorb vertical thrust in the event pumping system 10 contacts a lower extremity of the well or a portion of the casing, such as in a non-vertical well.

It should be noted that, as described below, cable assembly 16 is installed in coiled tubing 14 by application of compressive and tensile loading, in combination, on either end of a stand of coiled tubing. The coiled tubing/cable assembly package may then be transported to and coupled to a pumping system of the type illustrated in FIG. 1 to support the pumping system and to supply electrical power thereto. However, the present technique for installing a cable assembly in a length of coiled tubing may be employed for other types of applications, including pumping system deployed in horizontal or directional wells, various equipment employed in submarine applications, and so forth. The technique is particularly well suited to applications in which armored cable assemblies are disposed in coiled tubing stands of considerable length, such as several thousand feet.

Figure 2:
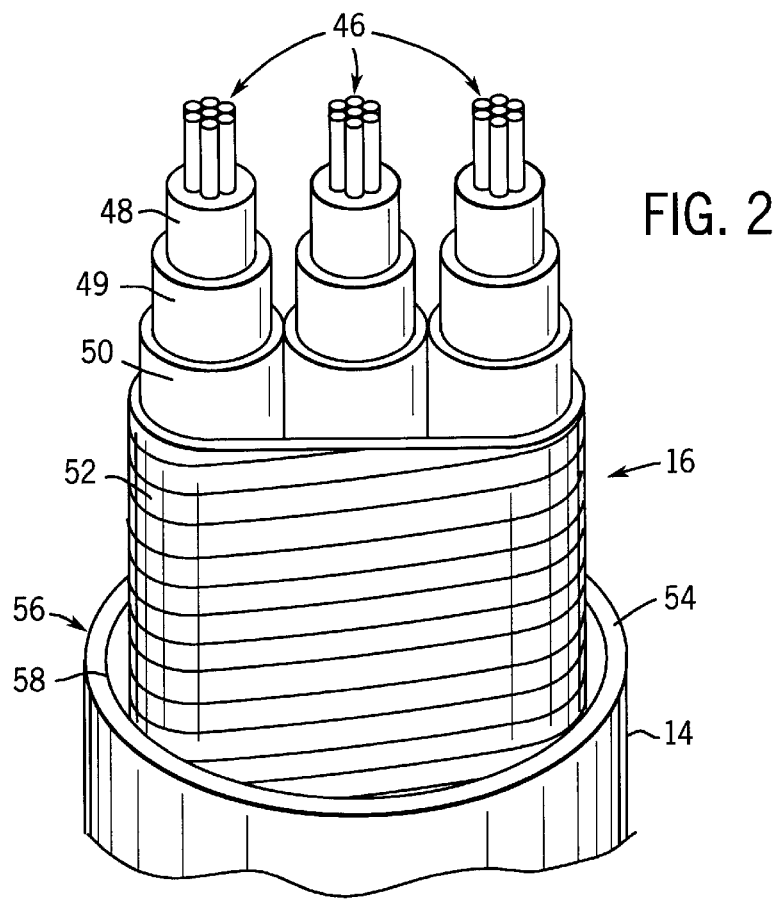
FIG. 2 is a perspective view of an end of a stand of coiled tubing in which a first type of multi-conductor cable has been installed for use in a system of a type illustrated in FIG. 1.

FIGS. 2, 3, 4, and 5 illustrate several exemplary embodiments for the cable assembly and coiled tubing combination which may be formed in accordance with the present technique for use in systems such as that of FIG. 1. As shown in FIG. 2, cable assembly 16 preferably comprises a plurality of individual cables 46. Each cable may include a bundle of conductors, as shown in FIG. 2, or a single bar or rod-type conductor. Each cable further includes at least one insulation layer 48 surrounding the conductor or conductors for providing electrical isolation of each conductor from one another and from the coiled tubing. Insulation layers 48 may include layers of polyimide tape, EPDM, or any other suitable insulating material. Further, each cable may include a chemical barrier 49, such as lead or fluorocarbon tape to prevent chemical attack and gas decompression, particularly in hot, gassy, or more aggressive well environments. Finally, an insulative jacket 50 is provided either about each cable or about the set of cables to further isolate the cables from the well environment. In a presently preferred configuration, jacket 50 includes a nitrile rubber, providing resistance to oils and other petrochemicals. An armor layer 52 is wrapped around the set of conductors to complete cable assembly 16. In presently preferred configurations, armor 52 comprises galvanized steel or monel which is wrapped or interlocked around the individual cables during assembly.

Figure 3:
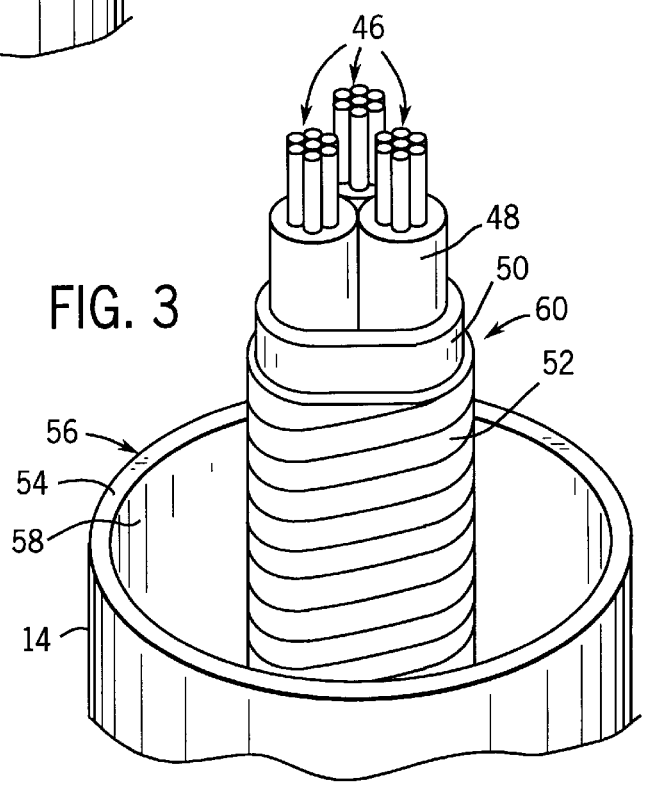
FIG. 3 is a perspective view of an alternative configuration for a cable assembly installed in a length of coiled tubing for use in a system of the type shown in FIG. 1.

FIG. 3 represents an alternative configuration for a cable assembly which may be deployed in a length of coiled tubing in accordance with the present technique. As shown in FIG. 3, alternative cable assembly 60 may form a generally round structure including a series of individual cables 46 as described above with reference to FIG. 2. Each individual cable may include a plurality of bound conductors as shown in FIG. 3, or a single unitary conductor. Each cable further includes an insulative layer 48, such as a rubber or polyimide tape. Further, the cables 46 are insulated by an insulative jacket 50. In the embodiment of FIG. 3, a single insulative jacket surrounds the set of cables, and is covered by a wrapped armor layer 52 of the type described above.

Figure 4:
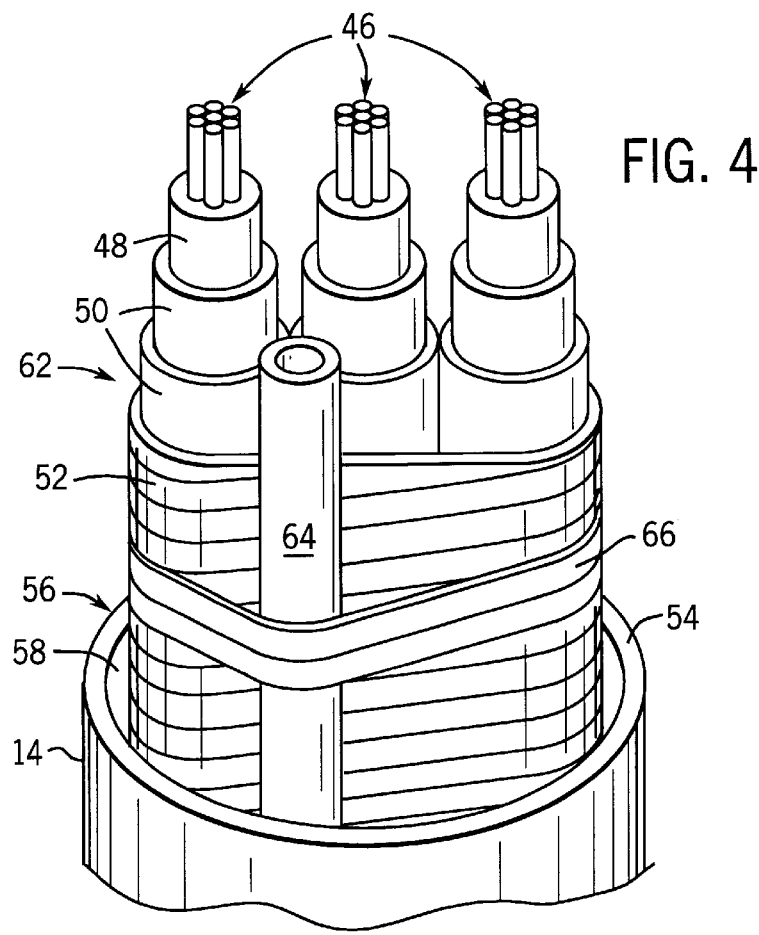
FIG. 4 is a perspective view of a further alternative configuration for a cable assembly incorporating an additional tube or control line installed in a length of coiled tubing for use in a system of the type shown in FIG. 1.
Figure 5:
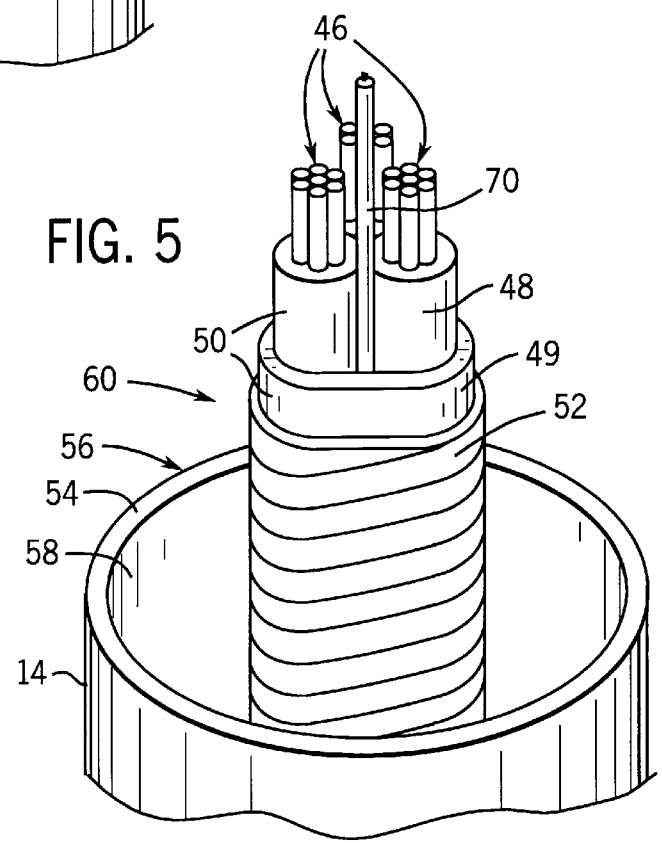
FIG. 5 is a perspective view of a further alternative configuration of a cable assembly for use in a system of the type shown in FIG. 1.

As shown in FIGS. 4 and 5, the cable assembly used in the present technique may include alternative or additional conductors, control lines, signal carriers, and so forth in a single bundle, or in an assembly of a standard cable construction and an additional line. Thus, for example, as shown in FIG. 4, a control line or injection tube may be secured to a standard cable configuration of the type shown in FIG. 2. Control line 64 may include a length of steel tubing, or another type of fluid conduit through which chemicals may be injected, or which may be employed to actuate components of a pumping system, such as inflatable packers, sliding sleeve-type valves, and so forth. When secured to a standard cable assembly, line 64 may be bound to the cable assembly by a series of straps 66 prior to deployment of the cable assembly in the coiled tubing.

In the embodiment of FIG. 5, an alternative cable assembly is formed by inclusion of a control or data line 70 directly within the armored cable assembly. Line 70 may be a single or multi-conductor line, such as a small data transmission cable assembled with cables 46 during fabrication of the cable assembly. Line 70 may be employed for transmitting electrical control signals to a submersible pumping system, for accessing data from instrumentation employed in the pumping system, and so forth.

The various exemplary cable assemblies of FIGS. 2, 3, 4, and 5 are illustrated as deployed in a standard coiled tubing 14. The cable assemblies extend from each end 54 of the coiled tubing to facilitate connection both to the application, such as to coiled tubing connector 28 in FIG. 1, as well as to a source of electrical power, such as power generation or power supply circuitry situated at the earth's surface. As will be appreciated by those skilled in the art, coiled tubing 14 is typically formed of a continuous length of metallic tubing having a wall 56 of sufficient thickness to prevent collapse of the coiled tubing in application, but sufficiently flexible to permit the coiled tubing to be wound on a transport reel and unwound from the reel at the application. Within coiled tubing 14, the cable assembly is in contact with interior wall surfaces 58 extending therealong.

It has been found that in heretofore known coiled tubing-deployed pumping systems including a cable assembly extending through the coiled tubing, significant problems can develop as a result of the installation technique used to position the cable within the coiled tubing. For example, in various known techniques, tensile forces alone are imposed on the cable assembly to draw the cable assembly into a stand of coiled tubing through an entry end. Due to inherent elasticity in the cable assembly, however, frictional forces between an interior surface 58 of the coiled tubing and a jacket or armor on the cable assembly may result in significant elongation of the cable assembly in the length of coiled tubing. Where significant lengths of coiled tubing and cable are employed, this elongation may lead to residual elastic deformation or strain in the cable, the subsequent relaxation of which tends to withdraw the cable assembly back into the coiled tubing prior to or subsequent to deployment. In such cases, disconnection from either power supply equipment or from the pumping system may occur, resulting in loss of production and necessitating costly retrieval of the pumping system for reworking.

Figure 6:
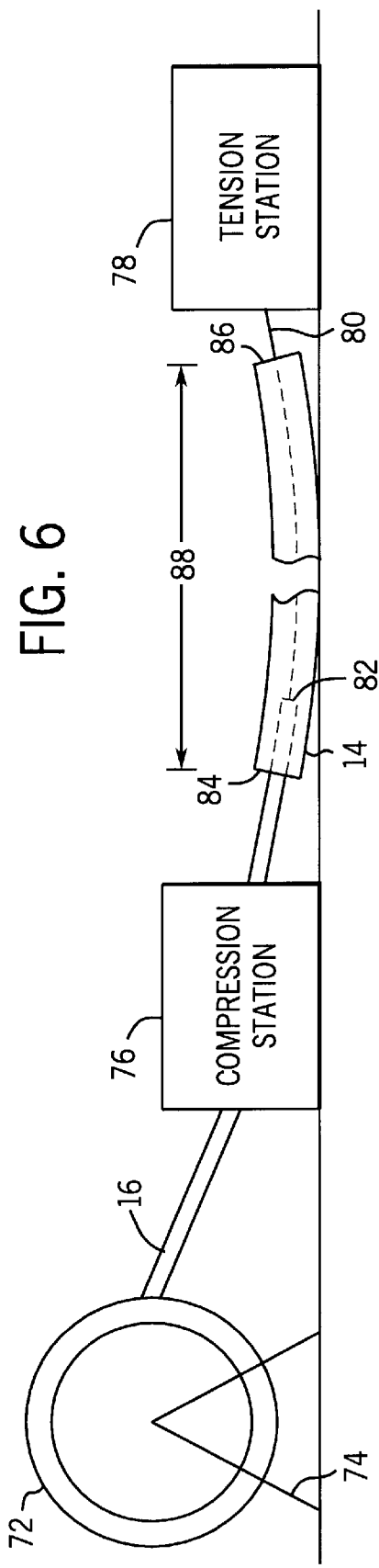
FIG. 6 is a diagrammatical representation of an arrangement for installing a length of cable assembly, such as those illustrated in FIGS. 2, 3, 4, and 5 in a length of coiled tubing in accordance with certain aspects of the present technique.

In accordance with the present technique, cable assemblies of the type shown in FIGS. 2, 3, 4, and 5 are positioned within a length of coiled tubing by application of both compressive and tensile forces. FIG. 6 illustrates diagrammatically an installation for exerting such forces to position a length of cable in a stand of coiled tubing. As shown in FIG. 6, the cable assembly, once fabricated, is stored on a cable reel 72 supported in rotation by a reel support 74. The cable 16 is unwound from reel 72 and fed into a compression station represented generally at reference numeral 76 where compressive forces are imparted on the cable to urge the cable into a length of coiled tubing 14. Tensile forces are also applied to the cable assembly by a tension station 78 situated adjacent to an opposite end of the length of coiled tubing. The presently preferred configuration of compression station 76 will be described in greater detail below with reference to FIGS. 7 and 8. Tension station 78 preferably includes a conventional wire line unit such as for extending and retracting a high tensile strength wire supported on a drum wench (not shown). Tension station 78 thus draws a thin, high tensile strength wire 80 through coiled tubing 14 to assist in installation of the cable assembly within the coiled tubing. Wire 80 is coupled to the cable end 82 as described in greater detail below. Both the wire line and the cable assembly are then drawn into an entry end 84 of the coiled tubing, and extracted through an exit end 86 adjacent to tension station 78. Various lengths of cable and coiled tubing may be assembled via the system illustrated diagrammatically in FIG. 6. For example, coiled tubing having a length 88 on the order of 4,000 to 5,000 feet or more, may be handled through such arrangements, being limited by such factors as the capacity of transportation reels on which the coiled tubing is stored following installation of the cable assembly therein.

Figure 7:
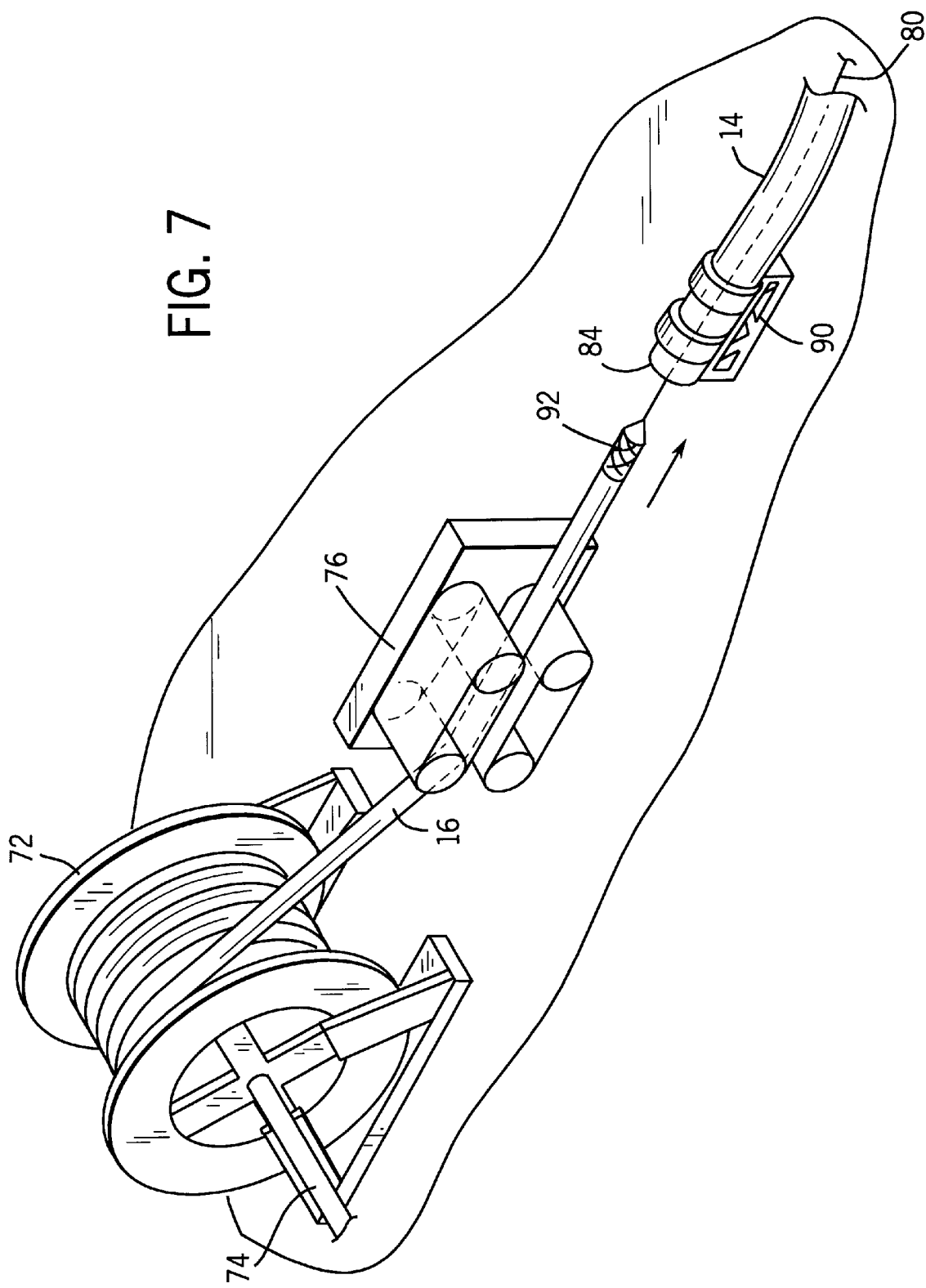
FIG. 7 is a perspective view of a portion of the system illustrated in FIG. 6 for urging the cable assembly into the coiled tubing.

FIG. 7 illustrates in somewhat greater detail a preferred configuration for an upstream or compression side of the system illustrated in FIG. 6. As shown in FIG. 7, cable 16 is wound on reel 72, which is, in turn, supported by reel support 74. Reel support 74 may include various drive equipment or brakes (not shown) for controlling the payout or retraction of the cable assembly on reel 72 as desired. Compression station 76 exerts radial compressive forces on sides of the cable assembly to force the cable assembly into entry end 84 of coiled tubing 14. In the illustrated embodiment, coiled tubing 14 is extended lengthwise along a relatively flat support surface, such as a roadbed, and entry end 84 is supported on a coiled tubing support 90 which orients entry end 84 toward compression station 76. It has been found that for substantial lengths of coiled tubing, the weight of the coiled tubing alone is sufficient to withstand frictional forces exerted between cable assembly 16 and the interior surfaces of the coiled tubing during the installation process to prevent backsliding or other undesirable movement of the coiled tubing. However, where desired, a coiled tubing support, such as support 90, may be secured to compression station 76 to further inhibit such rearward movement. Also as illustrated in FIG. 7, a coupling or splice 92 is formed between wire 80 and cable assembly 16 prior to beginning the cable installation process. Any suitable splice technique may be employed for this purpose, so long as the splice is capable of withstanding the tensile forces exerted by wire 80 during installation.

Figure 8:
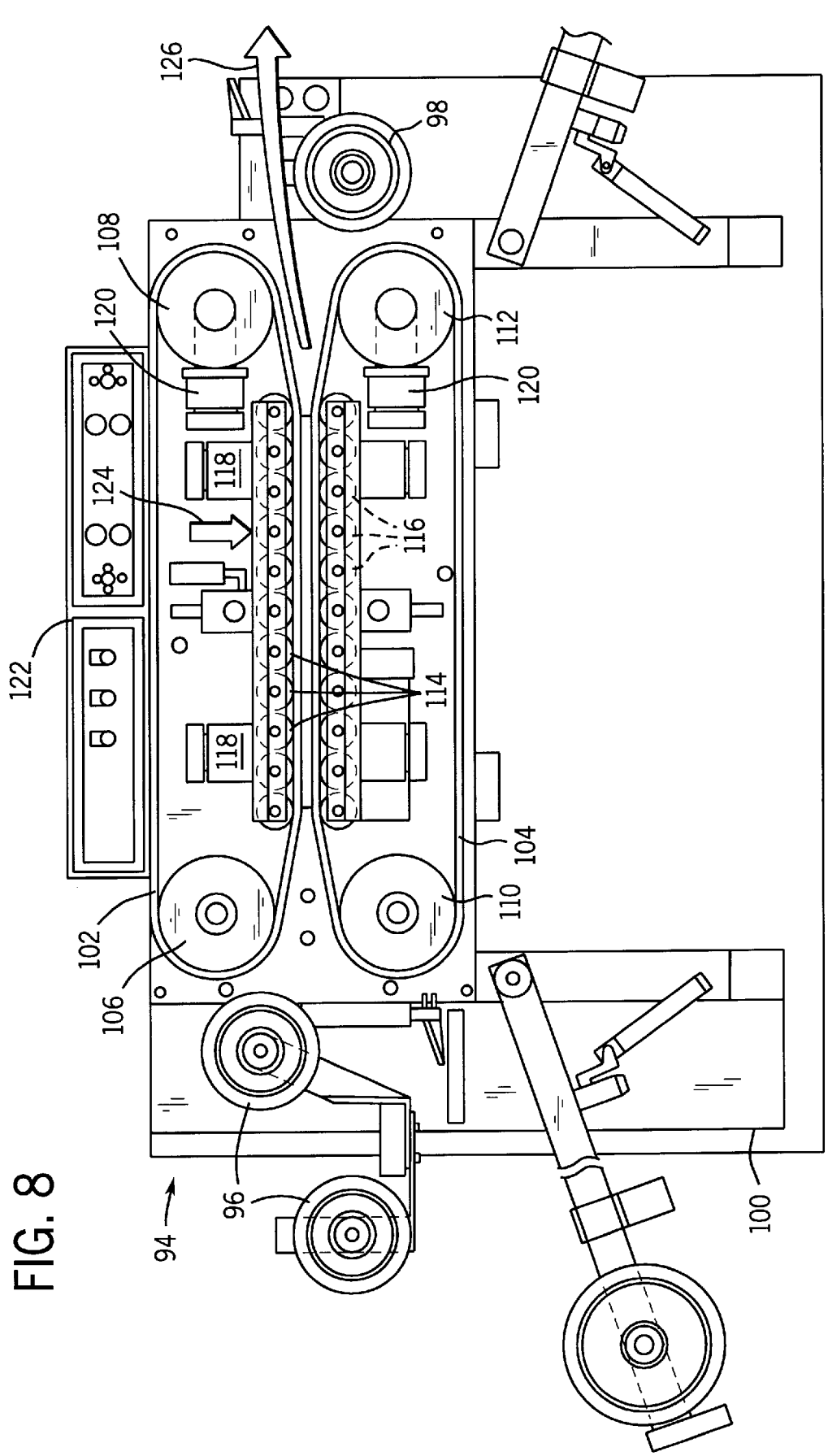
FIG. 8 is a perspective view of an exemplary station for compressively urging the cable assembly into a length of coiled tubing in a system of the type shown in FIG. 7.

FIG. 8 shows in greater detail a presently preferred track feed device 94 for use in compression station 76. Track feed device 94 may be of a type employed for continuous processing of cable assemblies, such as a device available from Cancab Technologies Ltd. of Mississauga, Ontario, Canada, under the commercial designation Cleat-Type Caterpuller. As shown in FIG. 8, track feed device 94 includes infeed rollers 96 which orient cable assembly 16 at an infeed side, adjacent to reel 72 in the installation of FIGS. 6 and 7. Similarly, outfeed rollers 98 direct cable assembly 16, under compressive forces, toward inlet end 84 of the coiled tubing (see FIGS. 6 and 7). A support frame 100 supports and houses drive and compression actuators for exerting lateral compressive forces on the cable assembly end and for driving the cable assembly in a forward direction.

In the illustrated embodiment, the compressive forces are exerted by an upper track or belt 102 and a mutually-facing lower track or belt 104. In a present embodiment, tracks 102 and 104 are endless, double-roller chains with rubberized cleats for contacting and exerting compressive forces on the cable assembly. Track 102 is supported on end rollers 106 and 108. Similarly, lower track 104 is supported on end rollers 110 and 112. One or more of the end rollers for at least one of the tracks is driven via electric motor drives (not shown) within support frame 100. A series of upper and lower compression rollers 114 and 116, respectively, contact the upper and lower tracks to exert mutually opposed compressive forces which serve as normal forces for gripping and transporting the cable assembly during processing. Pressure regulated air diaphragms 118 create such forces and urge the compression rollers, and thereby the tracks, into tight engagement along the cable assembly during processing. Similar air diaphragms, or mechanical structures are provided for maintaining adequate tension of tracks 102 and 104, as indicated at reference numeral 120. An operator station or console 122 provides an interface for regulation of the actuators, and for regulating drive speeds. Thus, as indicated at arrow 124, compressive forces are exerted in mutually opposed relation between the driven tracks, resulting in a forwardly advancing compression force 126 at a downstream side of device 94.

Figure 9:
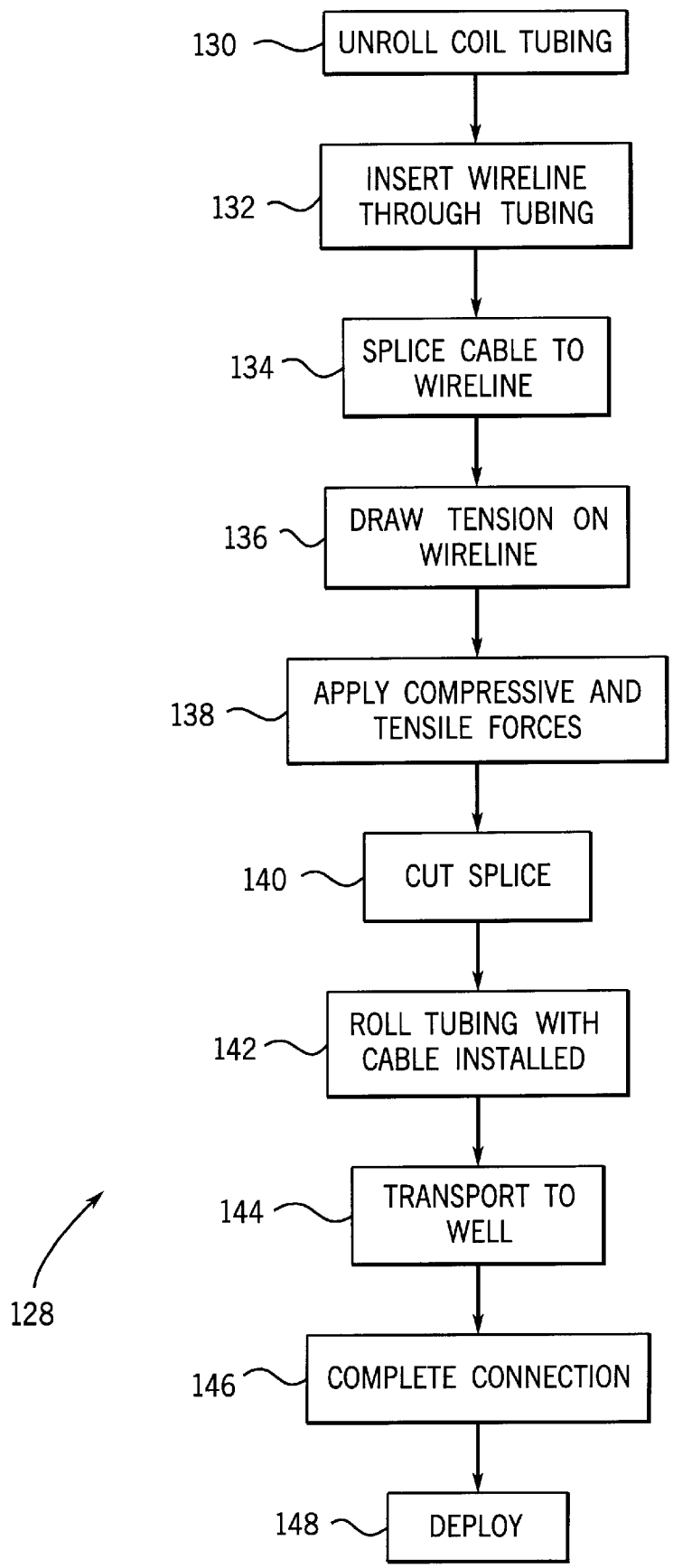
FIG. 9 is a flow chart illustrating exemplary steps in the present technique for installing a cable assembly in a length of coiled tubing.

A presently preferred sequence of steps for installation of a cable assembly in a stand of coiled tubing, and for incorporation of such an assembly in a submersible pumping system is illustrated in FIG. 9 and designated generally by reference numeral 128. Sequence 128 begins at step 130 where a length of coiled tubing is unrolled from a storage reel onto an extended, generally flat surface as shown in FIGS. 6 and 7. As mentioned above, where desired, the coiled tubing may be secured to supports 90 (see FIG. 7) at one or both ends. At step 132, a wire line is installed in the length of coiled tubing from a conventional wire line unit. The wire line is installed from the tension station, entering into the exit end of the coiled tubing, and exiting from the entry end. Next, at step 134, the cable assembly is installed in the compression station, and a splice is completed between the wire line and the cable assembly.

With the cable assembly thus coupled to the compression and tension stations, installation of the cable assembly and the coiled tubing begins at step 136 where tension is drawn on the wire line to begin the insertion process. At step 138, the compression and tension stations are driven, so as to maintain both a relatively constant tension on the cable assembly, thereby drawing the cable assembly into the coiled tubing. Such tensile forces are supplemented by compressive forces at the entry end of the coiled tubing. Both forces continue to be applied until the cable assembly is fully extended through the coiled tubing and exits through the exit end thereof. At step 140, the splice is cut, and the coiled tubing, with the cable assembly installed therein, may be rolled or wound back onto its storage reel as indicated at step 142.

Once rewound onto its storage reel, the coiled tubing and cable assembly structure may be stored and transported to an application site, such as a production well, as indicated at step 144. Necessary mechanical and electrical connections may then be completed on the free end of the coiled tubing and cable assembly as indicated at step 146, such as by installation of a coiled tubing connector 28 of the type illustrated diagrammatically in FIG. 1. The coiled tubing storage reel may then be unwound to deploy the submersible pumping system directly, as indicated at step 148.

Figure 10:
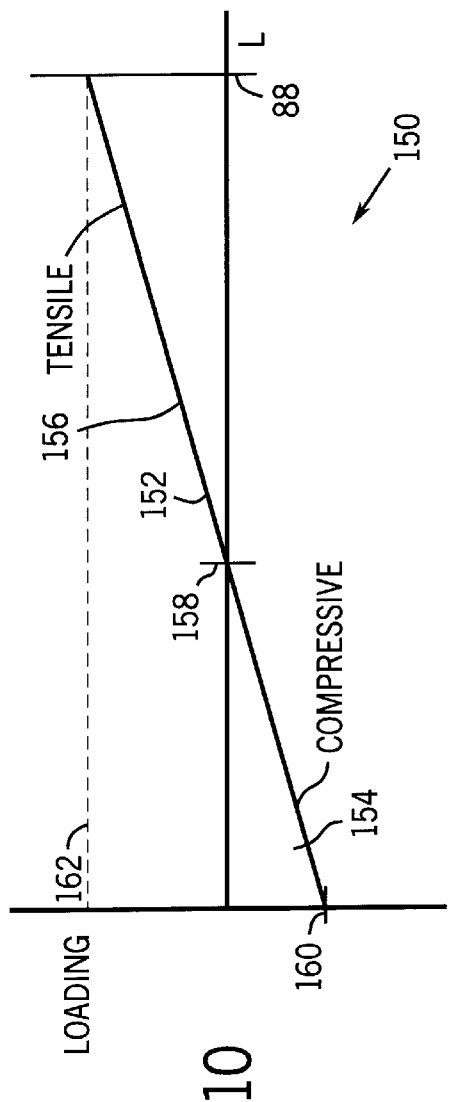
FIG. 10 is a graphical representation of exemplary forces exerted during installation of the cable assembly in the coiled tubing through the process summarized in FIG. 9.

FIG. 10 illustrates graphically the loading of cable assembly 16 during installation as described above. As shown in FIG. 10, a load curve 150 will generally take the form of linear function 152 having a compressive portion 154 and a tensile portion 156. At a point 158, the cable assembly will experience neither tensile nor compressive loads. As will be appreciated by those skilled in the art, the actual location of the zero-load point will migrate along the coiled tubing during the installation process, depending upon the magnitude of the compressive and tensile loads. In general, however, it is expected that as the cable assembly is installed over the fall length 88 of the coiled tubing a maximum compressive load 160 will be experienced adjacent to the entry end of the coiled tubing, whereas the maximum tensile load 162 will be experienced to an exit end. As will also be appreciated by those skilled in the art, by virtue of the combined loading of the cable assembly within the coiled tubing, residual elongation of the cable assembly is reduced for given lengths of cable assembly and coiled tubing as compared to conventional installation techniques.

In an exemplary embodiment, the foregoing technique may be employed for installation of a length of 1 3/16 inch O.D. cable assembly, such as a cable assembly commercially available from REDA of Bartlesville, Oklahoma under the designation No. 2 Redaline cable in 2 3/8 inch O.D. 2 inch I.D. tubing. The tubing may be of any desired length, such as 4,500 to 5,000 feet stored on a 15 foot to 18 foot diameter reel. In such applications, it is anticipated that a maximum compressive force on the order of 2,000 pounds may be exerted on the cable assembly during insertion into the coiled tubing, and a tensile force of 1,000 pounds may be sufficient on the tension side of the coiled tubing. As noted above, longer lengths of coiled tubing and cables may then be obtained by joining the assemblies resulting from the foregoing installation process.

Various modifications may be made to the foregoing cable installation and system deployment methods, depending upon the exigencies of particular applications. For example, while in the presently preferred method a length of coiled tubing is unwound from its storage reel and extended linearly for installation of the cable assembly by compressive and tensile forces, in certain applications the tubing may be left coiled on its reel and the cable installed directly therein. Similarly, in certain applications compressive forces alone may be sufficient to install the cable assembly in the coiled tubing. Moreover, while the cable assembly may be directly coupled to equipment following insertion into the coiled tubing, or may be extended freely from the ends of the tubing, restraining devices may be employed to maintain the cable extended from the tubing during subsequent handling and transport.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for installing a cable in an elongated conduit, the conduit having a substantially closed side wall extending between first and second open ends, the apparatus comprising:

a compression station disposed adjacent to the first end, the compression station contacting the cable and exerting compressive forces on the cable to urge the cable into the conduit via the first end thereof; and a tension station disposed adjacent to the second end, the tension station contacting the cable and exerting tensile forces on the cable to draw the cable toward the second end.

2. The apparatus of claim 1, wherein the compression station includes a drive unit having mutually opposed drive members configured to receive the cable therebetween and to urge the cable toward the first end of the conduit.

3. The apparatus of claim 2, wherein at least one of the drive members includes an endless belt configured to contact the cable along a predeternnined length thereof.

4. The apparatus of claim 1, wherein the cable includes an external shielding layer, and wherein the compression station exerts compressive forces against the shielding layer to urge the cable into the conduit.

5. The apparatus of claim 1, wherein the tension station includes an elongated tensile member and a winch for exerting tensile forces on the tensile member to draw the cable through the conduit.

6. The apparatus of claim 1, wherein the conduit has a predetermined length and the pushing and tension stations are disposed from one another by at least the predetermined length.

7. A method for installing a cable in an elongated conduit, the method comprising the steps of:

(a) exerting longitudinal compressive forces on the cable to urge the cable into the conduit via a first end thereof; and (b) exerting tensile forces on the cable to draw the cable through the conduit from a second end thereof.

8. The method of claim 7, wherein step (a) includes the step of drawing the cable through a compression station, the compression station contacting the cable to exert radial compressive forces on the cable to drive the cable into the conduit.

9. The method of claim 8, wherein the compression station includes at least two endless belts, the endless belts contacting the cable along a predetermined length thereof to distribute the radial compressive forces along the predetermined length.

10. The method of claim 7, wherein the cable includes an external shielding layer, and wherein the cable is urged into the conduit by exerting compressive forces against the external shielding layer.

11. The method of claim 7, wherein prior to step (a) the conduit is wound on a storage reel, and wherein the method includes the further step of unwinding the conduit from the reel to extend the conduit longitudinally.

12. The method of claim 11, including the further step of winding the conduit on the storage reel following installation of the cable therein.

13. The method of claim 7, wherein frictional forces between the cable and internal surfaces of the conduit are opposed primarily by the compressive forces during a first phase of installation and primarily by the tensile forces during a second phase of installation.

14. A method for installing a cable assembly in a length of coiled tubing, the method comprising the steps of:

(a) aligning the cable assembly with an entry end of the coiled tubing;

(b) applying a longitudinal compressive force to the cable assembly to drive the cable assembly through the coiled tubing; and (c) applying a longitudinal tensile force to the cable assembly from an exit end of the coiled tubing to draw the cable assembly through the coiled tubing.

15. The method of claim 14, comprising the further step of extending the coiled tubing generally linearly prior to application of the longitudinal compressive force to the cable assembly.

16. The method of claim 14, wherein the step of applying a longitudinal tensile force to the cable assembly from an exit end of the coiled tubing to draw the cable assembly through the coiled tubing includes extending a tensile member through the coiled tubing and coupling the tensile member to the cable assembly.

* * * * *